United States Patent [19]

Staron

[11] 4,085,229

[45] Apr. 18, 1978

[54] PROCESS FOR THE TREATMENT OF CAKES AND SEEDS OF VEGETABLE ORIGIN

[75] Inventor: Thadée Joseph Staron, Noisy le Roi (Yvelines), France

[73] Assignee: Institut National de la Recherche Agronomique, Paris, France

[21] Appl. No.: 684,031

[22] Filed: May 6, 1976

[30] Foreign Application Priority Data

May 12, 1975 France ................................ 75 14676

[51] Int. Cl.² .......................... C12D 13/06; A23L 1/20
[52] U.S. Cl. ........................................ 426/46; 426/44; 426/53; 426/656; 260/123.5
[58] Field of Search .................. 426/44, 46, 49, 52, 426/53, 656, 459, 460; 195/4; 260/123.5

[56] References Cited

U.S. PATENT DOCUMENTS

| | | | |
|---|---|---|---|
| 2,502,029 | 3/1950 | Sair | 426/46 |
| 3,096,177 | 7/1963 | Ariyama | 426/46 |
| 3,969,338 | 7/1976 | Staron | 426/53 X |

*Primary Examiner*—R. B. Penland
*Attorney, Agent, or Firm*—Burgess, Dinklage & Sprung

[57] ABSTRACT

The invention relates to the treatment of cakes and seeds of vegetable origin for obtaining proteins useful in animal or human feeding.

It consists in subjecting a cake or seeds, under maceration conditions, to the action of at least one microorganism in separating the insoluble products from the reaction medium, in solubilizing the proteins contained in said insoluble products by means of an alkali and in precipitating and biologically coagulating the said proteins at their isoelectric pH.

Protein isolates obtained according to the process of the invention are suitable to human and animal feeding.

21 Claims, No Drawings

PROCESS FOR THE TREATMENT OF CAKES AND SEEDS OF VEGETABLE ORIGIN

The invention relates to the field of the treatment of cakes and seeds of vegetable origin. It more particularly relates to a process using a chemico-biological way to detoxicate and improve the value of such cakes or seeds of vegetable origin in order to obtain proteins.

French Pat. No. 70 04 682, incorporated herein as reference, describes a process for removing the toxic sulphur containing products contained in colza cakes, consisting essentially in treating cakes by biological means using a microorganism selected from bacteria, yeasts and fungi and preferably a yeast belonging to the species *Geotrichum candidum;* said process permits the value of colza cakes to be improved, notably in order to obtain proteins.

Processes have also been described for obtaining proteins by the treatment of cakes made from vegetable seeds other than colza seeds or made from green plants; in this connection, reference may be made to French Patent No. 71 07 977 and French patent application No. 75 04 263 filed by the applicant incorporated herein as references; the processes described in these references also make use of a microorganism. Other processes for obtaining protein isolates have also been proposed; reference may be made to the article "Preparation of a colourless sunflower protein isolate" by S. GHEYA-SUDDIN and al [Food Technology vol. 24, 242-243] which relates to the preparation of sunflower protein isolates by extraction with an aqueous alkaline solution of sodium sulphite; the use of sodium sulphite during a conventional step for alkaline extraction of sunflower proteins makes it possible to eliminate the chlorogenic acid responsible for the green colour of the proteins obtained by alkaline extraction, without denaturing the said proteins. French patent No. 73 29 327, which relates to a process using lime to treat sunflower protein solutions obtained by alkaline dissolution of an aqueous dispersion of sunflower cake, may also be mentioned. The proteins dissolved for example by the process described above are then generally precipitated at their isoelectric pH by the use of an acid solution; this precipitation can also be effected with a microorganism culture, for example, by lactic or acetic fermentation; in this connection, reference may be made to the following documents: "Soybeans and soybean products" edited by KLARE S. MARKLEY; Vol. 1, Interscience Publishers Inc., New York and the article "Soybean protein isolates obtained by fermentative precipitation" by Banu and al; Chemical Abstracts, Vol. 77 (1972) 138-485 h.

Another process has now been found for the treatment of cakes and seeds of vegetable origin. The invention more particularly relates to a process permitting cakes and seeds of vegetable origin to be detoxicated and their value to be improved by chemico-biological means in order to obtain proteins usable for human and animal feeding.

Numerous cakes and seeds of vegetable origin are available at present time but their potential nutritive value is badly exploited. The protein balance of many cakes and seeds of vegetable origin is not always satisfactory. Particularly the nitrogen efficiency of the proteins of cakes, such as soya cakes, is not always sufficient to render them fit for consumption by animals and, a fortiori, by man.

Furthermore, it is known that certain oleaginous seeds, such as colza, sunflower, cotton, copra, groundnut, linseed seeds and the like, and leguminous seeds such as horse-bean seeds, are rich in proteins but unfortunately contain contaminating agents which are difficult to eliminate by simple extraction processes; such agents are, notably, toxins, antinutritional agents, tannins, phenols, colouring matters, etc. In this connection, it may be mentioned that various organic or mineral reagents have already been tested for the destruction or inactivation of the aflatoxins contained in groundnut meals or cotton seeds (see, for example, Journal of the American Oil Chemists' Society, Vol. 47, 1970, p. 173-176).

The presence of such contaminants, notably that of sulphur-containing products, in cakes and seeds of vegetable origin is at the origin of numerous physiological troubles observed in animals fed with said cakes.

The object of the invention is a process for the treatment of cakes and seeds of vegetable origin which eliminates the drawbacks of the prior technique.

Another object of the invention is a process for detoxicating and improving the value of such cakes and seeds by chemico-biological means.

The invention also relates to the protein products, referred to hereafter as protein concentrates and isolates, obtained from said cakes or seeds by chemico-biological means, such concentrates and isolates being suitable to human and animal feeding. The protein concentrates and isolates obtained by the process of the invention generally have a protein content higher than about 60% by weight, this content being often between about 70 and 95% by weight.

Generally speaking the process of the present invention comprises the steps of subjecting a cake or seeds of vegetable origin to the action of at least one microorganism under maceration conditions, of separating the insoluble products from the reaction mixture, of solubilizing the proteins contained in the said insoluble products by means of an alkali and of precipitating the said proteins at their isoelectric pH.

The precipitation step of the process of the invention is carried out either in a single phase by acidification, or in two phases consisting of acidification and biological precipitation as will be described in greater detail hereinbelow.

The cakes to which the process of the invention may be applied are made from any seeds of vegetable origin. Among these may be mentioned colza, sunflower, soyabeans, cotton, groundnut, copra, linseed and castor-oil cakes. The process of the invention may also be used with seeds notably of field beans, peas, beans or vinia sinensis.

The microorganism used in the first step of the process of the invention, i.e. the maceration step, must be capable of hydrolyzing the polysaccharides and impurities without peptonizing the proteins. The microorganisms suitable to the requirements of the present invention are fungi and/or yeast. The fungi which can be used in the process of the invention are notably soil commensal types, phytopathogens and the fungi used in food technology. As examples the following fungi may be mentioned: penicillium, aspergillus, erhizopus, achrostalagmus, verticilium, fusarium, trichoderma, cercospora, monilia, etc, and particularly:
*Rhizopus nigrieans*
*Penicillium roqueforti*
*Penicillium camemberti*

*Aspergillus oryzae*
*Verticilium alboatrum*
*Fusarium gramminaerum*
*Cercospora beticola*
*Monilia laxa*
*Trichoderma viridae*
*Achrostalagmus aphidum*

The yeasts suitable to the requirements of the invention notably belong to species geotrichum, saccharomyces, torula, candida and more particularly:

*Geotrichum candidum*
*Saccharomyces cerivisiae*
*Candida lipolytica.*

The microorganisms mentioned above are given as non-limitative examples; obviously any other microorganism answering the above general definition can be used for the purposes of the invention.

These microorganisms are described in detail in the following books mentioned in the present description as references: H. DARPOUX, Principaux Genres de Champignons Phytopathogenes. CNRA VERSAILLES 1962. E. MARCHAL, P. MANIL, R. VANDERVALLE, Elements de Pathologie Vegetale, (published by: Librairie de la Maison Rustique, Paris) 1948. P. LIMASSET and H. DARPOUX, Principes de Pathologie Vegetale, Publisher: Dunod, Paris.

The culture media of the microorganisms used are the usual media well known to one skilled in the art. Sabouraud, Czapek, nutritive potato, peptone, skimmed milk and Sauton media will be used according to the requirements of the strains.

A particularly advantageous medium is the one known as the Staron medium described in French patent application No. 75 04 263 and illustrated in greater detail below.

Said media are divided between 500 ml erlenmeyer flasks in amount of 100 ml per erlenmeyer flask and then sterilized for 15 minutes at 110° C. Seeding is carried out in a sterile manner with aqueous suspensions of spores or microorganisms. Culturing is carried out on a rotating stirrer at 25° or 37° C and during a variable length of time, depending on the strains; it is generally from 24 hours to 5 days.

The growth of the microorganisms is estimated by weighing after cropping and drying of the mycelium or microbial bodies. Bacteriological testing of the cultures is effected with photonic microscopy after culturing on selective media.

Among the particular microorganisms mentioned above the fungus *Achrostalagmus aphidum* and the yeast *Geotrichum candidum*, which is notably described in U.S. Pat. No. 3,803,328 are preferred; the strain of the above yeast is available in the INRA LAB Collection, where it bears the number GC-1, at Chartres-Luce (France).

The conditions for culturing the yeast *Geotrichum candidum* which have already been described in French Pat. No. 70 04 682 will be recalled by way of illustration. The same conditions apply to the fungus *Achrostalagmus Aphidum*.

The strain is preferably preserved on solid Sauton medium or Staron medium.

Starting ferments for fermentation may be obtained, for example, on the Staron culture medium consisting of:

(a) an inorganic solution of pH = 6.8 ($KH_2PO_4$ = 1g; $MgSO_4, 7H_2O$ = 0.5g; KCl = 0.2g; $CaCl_2$ = 0.2g; $FeSO_4, 7H_2O$ = 0.03g; $ZnSO_4, 7H_2O$ = 0.01g; $CuSO_4, 5H_2O$ = 2mg; distilled water:balance to 100 ml);

(b) glucose 35g/l or glycerol 30 g/l;

(c) uric acid 3 g/l or urea 2g/l

This medium is then sterilized for 15 minutes at 110° C.

Seeding is carried out in a steril manner with an aqueous suspension of a 5 day old culture of *Geotrichum candidum* obtained on a Sauton or Staron medium.

Culturing is carried out on a rotating stirrer (for example 130 revolutions/min) at 25° C; it lasts for 48 hours.

According to one non-limitative embodiment of this invention, five liters of the starting ferments thus obtained can be used to seed/50 l fermentor. After 30h of an aerobic culture at 25° C, said second culture will permit the inoculation of 600 to 700 liters of a pure medium which, after development of the microorganism, will be used to inoculate a 6000 liter tank.

The amounts of *Geotrichum candidum* obtained during each 30h cycle range from 18 to 25g of dry mycelium per liter of culture medium. For *Achrostalagmus aphidum* these same amounts vary from 25 to 40g.

The growth of *Geotrichum candidum* is determined by weighting after cropping and dessication of the mycelium. Bacteriological testings of the cultures may be effected by phase-contrast direct photonic microscopy.

It should be noted that the yeast *Geotrichum candidum* and the fungus *Achrostalagmus aphidum* can develop on the other above mentioned conventional media. It will be easy for one skilled in the art to determine the culture conditions and medium to be used as a function of the microorganism in question.

Within the meaning of the present description, the words "maceration conditions" relate to a treatment essentially consisting of placing cake or seeds in intimate contact with strains of the selected microorganism, said treatment being carried out in an aqueous medium; such conditions are described for example in the applicant's French Pat. No. 71 07 977.

According to the present invention, an aqueous suspension of a cake is formed, said suspension containing advantageously between about 20 and 30% by weight of dry matter. It will be noted that the process of the invention is applied to cakes as they are available on the market.

The conventional maceration conditions imply a temperature slightly higher than ordinary ambient temperature, in the range of about 30° to 40° C for example. The length of maceration should be sufficient to permit detoxification of the cake used and hydrolysis of the undigestible polysaccharides; it generally varies as a function of the temperature and the microorganism used; for example it may be mentioned that the length of maceration according to the present invention is generally from about 24 to 45 hours when the temperature is between about 30° and 40° C.

At such temperatures said microorganisms do not develop but their enzymes are then at a maximum of activity, resulting in optimal destruction of various carbohydrates, antinutritional substances, phenols, tannins, and the like.

These multiple enzymatic activities produce about 20 to 30% solubilization of the hydrocarbon dry matter, resulting in a rapid and substantial decrease of the pH, which falls from about 6.2 to about 4 in about 15 to 20 hours.

The microorganisms used in the maceration step is added to the aqueous suspension of crude cake, assaying about 20 to 30% by weight of dry matter, at the rate of about 0.1 to 0.5 liter of microbial culture per kilogram of cake.

Maceration is carried out under stationary, or preferably stirred, conditions; slow stirring in the order of about 45 to 60 revolutions/min is sufficient for using the process of the invention.

It is preferable to ventilate the reaction medium to extract the gas produced during fermentation.

As in the process described in French Pat. No. 70 04 682 the maceration step does not require preliminary sterilization.

After maceration the insoluble products are removed from the reaction medium by filtration or centrifugation for example.

The proteins in the insoluble products thus isolated are made soluble by means of an alkali.

In the process of the present invention, the alkali is used in an amount sufficient to permit protein to be made soluble, the pH of the resulting reaction medium should be in the range of about 10.5 to 11.

As an alkali suitable to the process of the invention may be mentioned sodium hydroxide, potassium hydroxide, ethanolamine and other lower alkanolamines; sodium hydroxide is particularly preferred. The temperature of the reaction mixture during the solubilization step is from about 35° to 45° C, and is preferably about 40° C.

According to one embodiment of the invention, the solubilization or solubilizing step is carried out with sodium hydroxide in the presence of a reducing agent such as sodium sulphite; the concentration of sodium sulphite used in the process of the invention is generally between about 0.5 and 1%.

According to another preferred embodiment of the invention, protein solubilization is carried out by means of an alkali such as sodium hydroxide in the presence of an aldehyde, notably a short chain aldehyde including formaldehyde, the presence of such an aldehyde makes it possible to inhibit the formation of lysine/alanine which is reputed to be toxic.

Without wishing to restrict ourselves to any one theory, the mechanism of said inhibition is thought to be as follows:

The cysteine is desulphydilated in an alkaline medium; an amino-acrylic acid is formed and is spontaneously fixed on the distal amino group of lysine to give lysino-alanine, a very stable compound resisting acid hydrolysis (reaction 1).

The addition of formaldehyde to the alkaline extraction solution (Sorensen reaction) permits the formation of addition compounds with free amino groups. There would thus be formation of N-hydroxymethyl-lysine, which is unfit for reacting with amino-acrylic acid (reaction (2)).

The amount of formaldehyde should be adapted to the conditions of the experiment, otherwise there is a loss of tyrosine and formation of hydroxymethyl-tyrosine (reaction (3)).

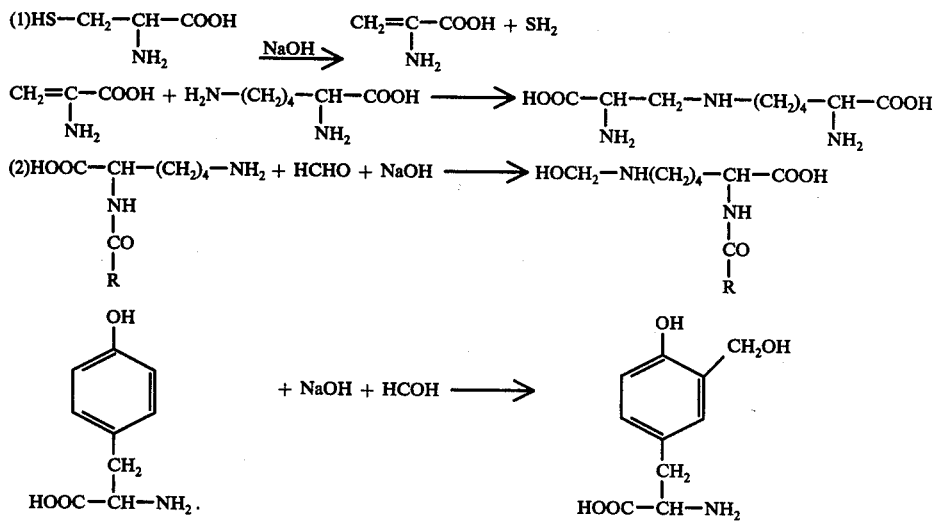

Among the short chain aldehydes suited to the requirements of the present invention may be mentioned formaldehyde, glutaraldehyde, acetaldehyde, glyoxal, glyoxylic acid, for example.

As for an example, it should be noted that when the alkali is 0.1N sodium hydroxide convenient solubilizing of proteins is generally obtained by using about 3 to 4 parts of 0.1N sodium hydroxide for one part of insoluble products, said sodium hydroxide may contain about 0.3% (by weight) of formaldehyde, such an amount of formaldehyde being sufficient to prevent the formation of lysino-alanine.

After solubilizing of the proteins with an alkali, the solid residues contained in the resulting reaction medium are removed by separation processes well known by the one skilled in the art and proteins are precipitated at their isoelectric pH; according to the present invention the said precipitation can be effected in one or two steps.

According to one embodiment of the process of the invention, the previously solubilized proteins are precipitated by acidifying the reaction medium, i.e., the protein solution up to the isoelectric pH of the latter, that is to say, to about pH 4.5 to 5.5. Hydrochloric acid, for example, may be used as the acid, or a food organic acid such as citric acid; hydrochloric acid is particularly preferred according to the invention.

According to another particularly preferred embodiment of the process of the invention, protein precipitation is effected in two steps, according to this embodiment, the protein solution is acidified up to a pH of about 8.5 with, for example, hydrochloric acid in a first step, and then biological precipitation is carried out by Table I below is a schematic representation of the process steps of the invention.

TABLE I

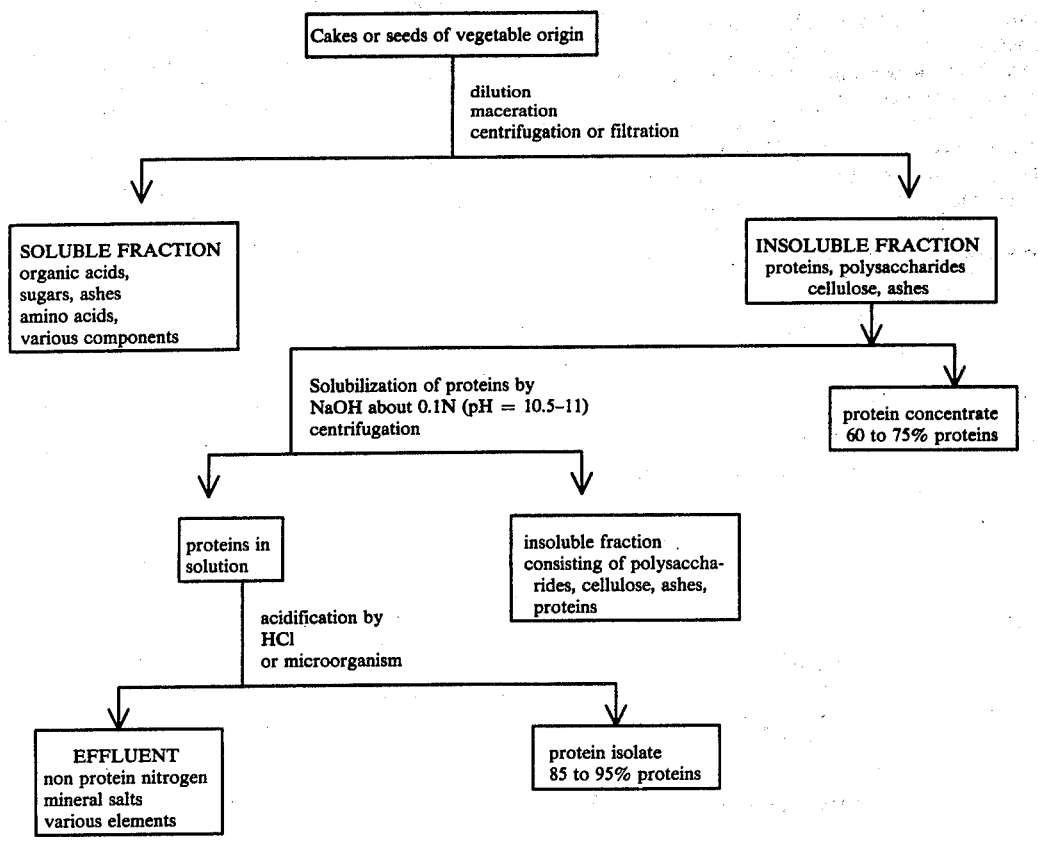

subjecting the reaction medium, under maceration conditions, to the action of a microorganism selected from yeasts and/or bacteria. This biological precipitation is generally carried out under the same conditions as those previously described for the maceration step for about 2 to 4 hours. The pH of the reaction medium then decreases from 8.5 to about 4.5 owing to the modifications made by the microorganisms, and the proteins coagulate.

The microorganism used in the biological precipitation step is a yeast or a bacterium, as it was previously stated.

As suitable yeasts, there may be mentioned the yeasts described above with respect to the maceration step and notably Geotrichum candidum, Saccharomyces cerevisiae. The bacteria which can be used in the present invention are essentially lactic ferments and notably lactic streptococci and lactobacilli.

Such microorganisms are described in detail in the book by A. ROCHAIX and A. TAPERNOUX "Le lait et ses derives" (Milk and its derivatives), published by Vigot Freres, Paris, 1948.

After the precipitation step the proteins are dried, by spraying for example.

Biological precipitation of alkali-extracted proteins makes it possible the elimination of a substantial amount of undigestible residual sugars. The process of the invention thus permits protein isolates of high biological value to be obtained. Said protein isolates can be converted into vegetable meats and be easily incorporated into traditional human foodstuffs.

The invention will be illustrated in greater detail by the following non limiting examples.

EXAMPLE 1

This example relates to soya cake and illustrates the process of the present invention.

Crude soya cake was mixed with water until a suspension was obtained assaying about 25% dry matter. 0.1 to 0.3 liter of Geotrichum candidum culture (obtained by the procedure described above) per kilogram of cake was then added.

Maceration was carried out in a fermentor for 30 hours at a temperature of approximately 40° C. In order to maintain an even temperature in the fermentor tank it was rotated at 45-60 rotations/min and the reaction medium was ventilated to extract the gas produced during fermentation.

The insoluble products in the reaction medium were then recovered by filtration.

The insoluble products thus recovered can be dried to obtain a product designated below as concentrate I(soya); said product is similar to those obtained by the process described in French Pat. No. 71 07 972.

According to the invention, the insoluble products were then treated with sodium hydroxide in order to make soluble the proteins contained in said insoluble products. For this purpose, 4 parts of 0.1 N sodium hydroxide containing 0.3% formaldehyde were added to the insoluble products to avoid the formation of lysino-alanine. The resulting reaction medium was heated for about 20 minutes at a temperature of about 40° C. The reaction medium was then centrifuged to remove the sodium-containing insoluble products. The proteins in the resulting liquid fraction were then precipitated by acidification of said solution with hydrochloric acid to pH 4.9 and a protein isolate was obtained, named hereinafter as "isolate II" (soya); the composition of said isolate is given in table II below.

Instead of using the yeast Geotrichum candidum in the maceration step similar results were obtained by the use of one of the following microorganisms or a mixture thereof:
  Rhizopus nigrieans
  Penicillium roqueforti
  Penicillium camemberti
  Aspergillus oryzae
  Verticilium alboatrum
  Fusarium gramminaerum
  Circospora beticola
  Monilia laxa
  Trichoderma viridae
  Achrostalagmus aphidum
  Geotrichum candidum
  Saccharomyces cerivisiae
  Candida lipolytica.

EXAMPLE 2

The same procedure was followed as in example 1 except that the protein precipitation step was effected in the following manner: the protein solution, obtained from the solubilization step using sodium hydroxide and which was insoluble residue-free, was acidified up to pH 8.5 with hydrochloric acid and 10 milliliters of Geotrichum candidum culture per liter of solution was then added. The resulting reaction medium was left to stand for about 3 hours at about 38° C. The pH of said reaction medium dropped from 8.5 to 4.5 and the proteins were thus precipitated owing to the changes made by the yeast, the protein isolate thus obtained is named hereinbelow as isolate III (soya); its composition is given in table II.

Similar results were obtained using the yeast Saccharomyces cerivisiae, a lactic streptococcus or a lactobacillus during precipitation instead of Geotrichum candidum.

EXAMPLE 3

The same procedure was followed as in example 1 using groundnut cake, coprah cake and linseed cake instead of soya cake. The following protein isolates were obtained respectively:
-groundnut protein isolate named hereinafter as isolate IV (groundnut)
-coprah protein isolate designated hereinafter as isolate V (coprah)
-linseed protein isolate designated hereinafter as isolate VI (linseed).

The compositions of said isolates are given in table II.

The aminoacid composition of the isolates and concentrates was determined using a "TECHNICON TSM$_1$" type autoanalyser after hydrolysis in 6N hydrochloric acid and resolution.

Examination of table II shows that the soya concentrates obtained by the biological means, i.e., by the process described in French Pat. No. 70 04 682, have substantially the same composition of crude cakes.

With regard to the isolates, the substantial alterations in the protein which were observed during simple chemical extraction, i.e. solubilization with sodium hydroxide, were benign after preliminary maceration, probably because compounds which catalyze the destruction of certain indispensable amino-acids (lysine, methionine, cystine, threonine) have been removed by fermentation. In addition, biological precipitation made it possible to remove a substantial amount of undigestible residual sugars.

EXAMPLE 4

Determination of the Nutritional Value of the Protein Isolates of the Invention

The nutritional value of the protein fractions and their possible toxicity were tested on male rats of the Sprague Dawley strain.

The experiment lasted for 17 days. In addition to the protein fraction to be tested the feed contained starch, saccharose, groundnut oil, vitamin and mineral additives in amounts sufficient to form a balanced feed, as described in the example of French patent application No. 75 04 263. In each case the combined levels of cystine, methionine, lysine and threonine were at least 15% for 16 g nitrogen. The protein content of the feeds was about 10% by weight. Each experimental lot comprised 20 rats.

The MWI (mean weight increase per animal) and CE P (weight increase by amounts of proteins ingested) were mesured.

Table III below shows that the coefficients of protein efficiency (CPE) of the soya concentrates and isolates obtained by the biological and chemico-biological method are close to those of lactic caseine.

In addition, although the CPE of soya concentrates obtained by the conventional chemical means are satisfactory [the case of HCl concentrates (soya) or sodium isolates], less feed is eaten with the result that growth was much less marked.

After being fed the diet described above for four weeks the animals were killed by decapitation and subjected to post-mortem examination. All of them underwent a searching macroscopic examination; then the following tissues, organs, compartments and contents were removed from 10 animals of each lot and weighed, frozen and freeze-dried: blood serum, red blood corpuscles, heart, liver, kidneys, small intestin, large intestin, stomach, spleen, testicles, pancreas, brain, lungs, glutens, ependymal fatty tissue, contents of the stomach and intestins.

The following parameters were analyzed on the organs and tissues examined: fresh weight, dry weight, total lipids, phospholipids, cholesterol, total proteins. Free amino acids were determined in the sera of livers and hearts.

No metabolic anomalies were observed; however, animals from the lots whose feeds included soya cake, groundnut cake and coprah cake had caeca which were on an average 50% more voluminous. These distensions were probably due to more intense bacterial fermentation in this organ.

TABLE II
AMINOACID COMPOSITION IN % FOR 16 g N

| amino acid | whole hen's egg | coa's milk-casein | soya cake | soya concentrate* HCl | concentrate I (soya) | Sodium isolate of soya | isolate II (soya) | isolate III (soya) | groundnut cake | isolate IV (groundnut) | coprah cake | isolate V (coprah) | linseed cake | isolate VI (linseed) |
|---|---|---|---|---|---|---|---|---|---|---|---|---|---|---|
| LYS | 7.2 | 7.3 | 6.3 | 5.9 | 6.1 | 5.7 | 6.3 | 6.5 | 3.3 | 3.6 | 4.9 | 4.6 | 4.8 | 4.7 |
| HIS | 2.3 | 2.5 | 2.6 | 2.5 | 2.8 | 2.4 | 2.7 | 2.8 | 2.3 | 2.4 | 2.6 | 2.4 | 2.3 | 2.5 |
| ARG | 6.4 | 3.6 | 7.2 | 8.1 | 8.8 | 7.5 | 8.2 | 8.8 | 11.7 | 11.5 | 12.8 | 12.4 | 9.5 | 9.9 |
| ASP | 10.7 | 6.8 | 12.1 | 11.3 | 11.5 | 11.3 | 11.4 | 12.0 | 12.0 | 11.6 | 8.8 | 8.5 | 10.2 | 9.6 |
| THR | 5.0 | 4.3 | 4.0 | 3.6 | 3.6 | 3.8 | 3.8 | 3.7 | 2.7 | 2.8 | 3.5 | 3.4 | 4.0 | 3.9 |
| SER | 7.7 | 5.9 | 5.3 | 5.8 | 5.0 | 5.5 | 4.7 | 5.0 | 4.5 | 4.8 | 4.0 | 4.5 | 4.4 | 4.6 |
| GLU | 12.3 | 18.5 | 16.5 | 19.6 | 20.4 | 21.0 | 18.9 | 18.7 | 20.5 | 20.2 | 20.4 | 20.8 | 22.1 | 21.5 |
| PRO | 4.3 | 10.3 | 6.1 | 5.1 | 5.3 | 5.3 | 5.6 | 5.3 | 4.8 | 5.5 | 3.7 | 4.0 | 4.3 | 4.7 |
| GLY | 3.8 | 1.7 | 3.8 | 3.6 | 3.3 | 4.2 | 3.3 | 3.3 | 5.6 | 5.9 | 4.6 | 4.3 | 5.7 | 5.2 |
| ALA | — | 2.8 | 4.1 | 3.9 | 3.3 | 4.0 | 4.2 | 4.3 | 3.9 | 4.2 | 4.8 | 5.0 | 4.4 | 4.6 |
| CYS-MET | 5.8 | 3.7 | 3.6 | 3.4 | 3.5 | 2.3 | 3.6 | 3.7 | 2.7 | 2.3 | 4.3 | 3.9 | 3.4 | 3.3 |
| VAL | 7.4 | 5.5 | 4.8 | 4.6 | 4.5 | 4.7 | 5.1 | 4.5 | 5.0 | 4.8 | 5.8 | 5.9 | 5.5 | 5.3 |
| ILEU | 6.9 | 4.0 | 4.2 | 4.3 | 4.8 | 4.2 | 4.8 | 4.8 | 3.9 | 4.0 | 3.8 | 4.2 | 4.6 | 4.3 |
| LEU | 9.0 | 8.5 | 6.7 | 7.5 | 6.8 | 7.8 | 7.1 | 6.8 | 7.2 | 6.5 | 7.0 | 7.5 | 7.1 | 7.2 |
| PYR | 4.5 | 5.8 | 4.6 | 5.0 | 3.9 | 3.8 | 4.3 | 3.9 | 4.4 | 4.2 | 4.0 | 3.5 | 2.8 | 2.8 |
| PHE | 5.9 | 5.3 | 6.1 | 6.1 | 5.7 | 5.1 | 5.8 | 5.7 | 5.4 | 5.7 | 4.8 | 4.9 | 4.8 | 5.2 |
| TRP | 1.6 | 1.4 | 1.2 | — | — | — | — | — | — | — | — | — | — | — |
| % proteins | 13 | 87 | 50 | 65 | 70 | 85 | 87 | 87 | 49 | 84 | 23 | 82 | 31 | 81 |

\* soya cake extracted according to a known manner with HCl pH$_4$
\*\* direct extraction of cake with 0.1N sodium hydroxide.

EXAMPLE 5

The same procedure was used as in example 1 using sunflower cake and pea seeds instead of soya cake. The following protein isolates were obtained, respectively:
- pea protein isolate designated hereinafter as isolate VII (pea)
- sunflower protein isolate designated hereinafter as isolate VIII (sunflower)

The compositions of said isolates are given in table IV.

EXAMPLE 6

The food value and possible toxicity of the protein isolates obtained according to example 5 were determined on male rats of the Sprague Dawley strain according to the procedure described in example 4. The results obtained (MWI and CPE) are given in table V; this example also shows that the process of the invention makes it possible to obtain proteins for use as foodstuffs.

TABLE V
FOOD VALUE OF THE ISOLATES FED TO RATS

| Feed containing: | Mean weight of each rat at the start of the experiment (g) | Mean weight after 17 days on the diet (g) | M.W.I. (g) | Ingested/day/al (g) | CPE over 17 days |
|---|---|---|---|---|---|
| Pea meal | 60.5 | 125.1 | 3.8 | 13.1 | 2.9 |
| Isolate VII (pea) | 59.9 | 153.4 | 5.5 | 13.7 | 4.0 |
| Sunflower cake | 61.0 | 130.7 | 4.1 | 13.2 | 3.1 |
| Isolate VIII (sunflower) | 60.8 | 150.9 | 5.3 | 13.9 | 3.8 |

What we claim is

1. A process for the treatment of cakes and seeds of vegetable origin involving the action of a microorganism, comprising the steps of:
    (a) subjecting said cakes or seeds, to the action of at least one microorganism selected from the yeasts and fungi capable of hydrolyzing the polysaccharides and toxic impurities without peptonizing the proteins under maceration conditions to effect digestion,
    (b) separating the insoluble products from the reaction medium,
    (c) solubilizing the proteins contained in said insoluble products by means of an alkali in the presence of a reducing agent,
    (d) acidifying the protein solution obtained in step (c) to a pH of about 4.5 to 5.5 to coagulate the proteins at their isoelectric point.

2. The process of claim 1, wherein the microorganism used in step (a) is a yeast.

3. The process of claim 2, wherein the yeast is selected from the group consisting of:
    Geotrichum candidum
    Saccharomyces cerivisiae
    Candida lipolytiea.

4. The process of claim 1, wherin the microorganism used in step (a) is a fungus.

5. The process of claim 4, wherein the fungus is selected from the group consisting of:
    Rhizopus nigrieans
    Penicillium roqueforti
    Penicillium camemberti
    Aspergillus oryzae

TABLE III
FOOD VALUE OF CONCENTRATES OR ISOLATES TESTED ON THE RAT.

| Feed containing | Mean weight of each rat at the start of the experiment (g) | Mean weight after 17 days on the diet (g) | M.W.I (g) | Ingested/day/a[1] (g) | CPE over 17 days |
|---|---|---|---|---|---|
| lactic casein | 60 | 163.7 | 6.1 | 14.2 | 4.3 |
| soya cake | 59 | 142.3 | 4.9 | 12.5 | 3.9 |
| HCl concentrate (soya) | 60.7 | 137.2 | 4.5 | 12.1 | 3.7 |
| concentrate I (soya) | 58.9 | 150.7 | 5.4 | 13.5 | 4.0 |
| sodium isolate of soya | 60.2 | 135 | 4.4 | 12.9 | 3.4 |
| isolate II(soya) | 59.5 | 156.4 | 5.7 | 14.2 | 4.0 |
| isolate III(soya) | 59.7 | 160 | 5.9 | 14 | 4.2 |
| groundnut cake | 60.2 | 131.6 | 4.2 | 11.6 | 3.6 |
| isolate IV (groundnut) | 60 | 148.4 | 5.2 | 13.3 | 3.9 |
| coprah cake | 61.2 | 120.7 | 3.5 | 12.5 | 2.7 |
| isolate V (coprah) | 59.3 | 146 | 5.1 | 13.4 | 3.8 |

TABLE IV
AMINO ACID COMPOSITION IN % FOR 16 g N

| Amino acids | pea meal | Isolate VII (pea) | Sunflower cake | Isolate VIII (sunfower) |
|---|---|---|---|---|
| LYS | 6.8 | 6.7 | 3.8 | 3.6 |
| HIS | 2.1 | 2.3 | 2.5 | 2.8 |
| ARG | 8.8 | 8.6 | 8.4 | 8.6 |
| ASP | 12.2 | 12.5 | 10.1 | 9.5 |
| THR | 4.5 | 4.2 | 3.7 | 3.6 |
| SER | 4.4 | 4.5 | 4.0 | 4.7 |
| GLU | 18.3 | 18.8 | 21.9 | 21.6 |
| PRO | 4.3 | 4.1 | 5.0 | 4.6 |
| GLY | 4.4 | 4.5 | 5.5 | 5.3 |
| ALA | 4.2 | 4.4 | 4.2 | 4.3 |
| CYS—MET | 2.6 | 2.3 | 4.4 | 3.9 |
| VAL | 5.0 | 5.1 | 6.0 | 6.2 |
| ILE | 4.9 | 5.0 | 4.5 | 4.7 |
| LEU | 8.0 | 8.1 | 7.2 | 7.7 |
| TYR | 3.9 | 3.7 | 3.5 | 3.4 |
| PHE | 5.4 | 5.2 | 5.1 | 5.2 |
| TRP | — | — | — | — |
| % proteins | 23 | 87 | 35 | 84 |

*Verticilium alboatrum*
*Fusarium gramminaerum*
*Cercospora beticola*
*Monilia laxa*
*Trichoderma Viridae*
*Achrostalagmus aphidum.*

6. The process of claim 1, wherein the cakes are selected from cakes made from colza, sunflower, soyabeans, cotton, groundnut, coprah, linseed and castor oil.

7. The process of claim 1, wherein the seeds are selected from the group of horse-beans, peas, beans and vinia sinensis.

8. The process of claim 1, wherein the maceration conditions involve the intimate contact of the seeds and cakes with strains of the selected microorganism, said treatment being carried out in an aqueous medium.

9. The process of claim 8, wherein the temperature of maceration treatment is in the range of about 30° to 40° C and the pH of the reaction medium is between about 6.2 and 4.

10. The process of claim 1, wherein the protein solubilization is carried out by making alkaline the reaction medium up to a pH of 10.5 to 11.

11. The process of claim 10, wherein the reaction medium is made alkaline by means of an alkali selected from the group consisting of sodium hydroxide, potassium hydroxide and ethanolamine.

12. The process of claim 10, wherein the proteins are made soluble in the presence of a short-chain aldehyde.

13. The process of claim 12, wherein the aldehyde is selected from the group consisting of formaldehyde glutaraldehyde, acetaldehyde, glyoxal and glyoxylic acid.

14. The process of claim 1, wherein the acidification is carried out with hydrochloric acid.

15. Protein isolates obtained by the process of claim 1.

16. Proteins isolates obtained by the process of claim 2 and assaying about 80 to 95% proteins.

17. A process of claim 1 for the treatment of cakes and seeds of vegetable origin involving the action of a microorganism, comprising the steps of:
   (a) subjecting said cakes or seeds, to the action of at least one micoorganism selected from the yeasts and fungi capable of hydrolyzing the polysaccharides and toxic impurities without peptonizing the proteins under maceration conditions to effect digestion,
   (b) separating the insoluble products from the reaction medium,
   (c) solubilizing the proteins contained in said insoluble products by means of an alkali in the presence of a reducing agent,
   (d) acidifying the protein solution obtained in step (c) to a pH of about 8.5 and subjecting the resulting reaction medium to the action of a micoorganism selected from the yeasts and/or bacteria capable of coagulating the proteins under maceration conditions at their isoelectric point.

18. The process of claim 17, wherein the microorganism used in step (d) is selected from the yeasts *Geotrichum candidum* and *Saccharomyces cerivisiae*.

19. The process of claim 17, wherein the microorganism used in step (d) is selected from lactic ferments, lactic streptococci and lactobacilli.

20. The process of claim 17, wherein the microorganism used in step (a) is selected from the group of *Geotrichum candidum* and Achrostalagmus aphidum.

21. The process of claim 17, wherein the microorganism used in step (d) is selected from the group of *Geotrichum candidum*, the lactic streptococci and lactobacilli.

* * * * *

UNITED STATES PATENT AND TRADEMARK OFFICE
CERTIFICATE OF CORRECTION

PATENT NO. : 4,085,229
DATED : April 18, 1978
INVENTOR(S) : THADEE JOSEPH STARON It is certified that error appears in the above-identified patent and that said Letters Patent are hereby corrected as shown below:

Column 4, line 26, "Bacteriological" should start a new paragraph.

Column 5, line 1, "microorganisms" should read -- microorganism --.

Column 6, line 7, "Sorensen" should read -- Sörensen --.

Column 8, Table I, alongside box containing "protein concentrate" insert -- drying --.

Column 11, Table II, title of first column, "acid" should read -- acids -.

Column 11, line 13 in the first column, "IIE" should read -- ILE --.

Column 11, line 14 in the first column, "IEU" should read -- LEU --.

Column 11, line 15 in the first column, "PYR" should read -- TYR --.

Column 11, Title of third column across, "coa's" should read -- cow's --.

UNITED STATES PATENT AND TRADEMARK OFFICE
CERTIFICATE OF CORRECTION

PATENT NO. : 4,085,229
DATED : April 18, 1978
INVENTOR(S) : THADEE JOSEPH STARON It is certified that error appears in the above-identified patent and that said Letters Patent are hereby corrected as shown below:

Column 11, column entitled "soya cake", "1.2 11" should read -- 10.2 --.

Column 16, line 3, "2" should read -- 1 --.

Signed and Sealed this

Seventeenth Day of October 1978

[SEAL]

Attest:

RUTH C. MASON
Attesting Officer

DONALD W. BANNER
Commissioner of Patents and Trademarks